US011325475B2

(12) United States Patent
Kim

(10) Patent No.: US 11,325,475 B2
(45) Date of Patent: May 10, 2022

(54) BATTERY PACK AND TRANSPORTATION APPARATUS INCLUDING THE BATTERY PACK

(71) Applicant: Samsung SDI Co., Ltd., Yongin-si (KR)

(72) Inventor: Dukjung Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 16/570,108

(22) Filed: Sep. 13, 2019

(65) Prior Publication Data
US 2020/0086745 A1    Mar. 19, 2020

(30) Foreign Application Priority Data

Sep. 19, 2018 (KR) ......................... 10-2018-0112380

(51) Int. Cl.
| | | |
|---|---|---|
| *H02J 7/00* | (2006.01) | |
| *B60L 58/24* | (2019.01) | |
| *B60L 3/12* | (2006.01) | |
| *H01M 10/44* | (2006.01) | |
| *H01M 10/42* | (2006.01) | |
| *H01M 10/48* | (2006.01) | |
| *B60L 53/60* | (2019.01) | |

(52) U.S. Cl.
CPC ................. *B60L 3/12* (2013.01); *B60L 53/60* (2019.02); *B60L 58/24* (2019.02);
(Continued)

(58) Field of Classification Search
CPC ............ B60L 53/60; B60L 3/12; B60L 58/24; H01M 10/425; H01M 10/441; H01M 10/486; H02J 7/0026
(Continued)

(56) References Cited

U.S. PATENT DOCUMENTS

| | | |
|---|---|---|
| 7,763,375 B2 | 7/2010 | Igoris et al. |
| 2012/0139337 A1 | 6/2012 | Kim et al. |

(Continued)

FOREIGN PATENT DOCUMENTS

| | | |
|---|---|---|
| CN | 207311151 U | 5/2018 |
| KR | 10-1364408 B1 | 2/2014 |

(Continued)

OTHER PUBLICATIONS

EPO Extended Search Report dated Feb. 17, 2020, for corresponding European Patent Application No. 19198485.5 (7 pages).

*Primary Examiner* — Michael R. Fin
(74) *Attorney, Agent, or Firm* — Lewis Roca Rothgerber Christie LLP

(57) ABSTRACT

Provided are a battery pack, and a transportation apparatus including the battery pack. The battery pack includes a battery module, a battery management system configured to control charging and discharging operations of the battery module, a power supply terminal arranged to supply operation power, and a switch connected between the power supply terminal and the battery management system, and configured to be turned on in response to an abnormal situation of the battery module. Accordingly, it is possible to provide a battery pack, and a transportation apparatus including the battery pack, which may start a suitable protection operation by waking up a battery management system for monitoring a state of the battery pack, and by controlling a charge/discharge operation thereof, by detecting an abnormal situation of a battery module even when the battery management system is in a sleep mode.

15 Claims, 9 Drawing Sheets

(52) U.S. Cl.
CPC ....... *H01M 10/425* (2013.01); *H01M 10/441* (2013.01); *H01M 10/486* (2013.01); *H02J 7/0026* (2013.01); *B60Y 2200/91* (2013.01); *H01M 2010/4271* (2013.01); *H01M 2220/20* (2013.01)

(58) Field of Classification Search
USPC .......................................... 307/9.1, 131, 10.1
See application file for complete search history.

(56) References Cited

U.S. PATENT DOCUMENTS

| | | | |
|---|---|---|---|
| 2013/0049649 A1* | 2/2013 | Park | H02J 7/0045 318/139 |
| 2015/0263559 A1* | 9/2015 | Kim | H02J 7/0031 320/103 |
| 2016/0093456 A1* | 3/2016 | Dulle | H01H 47/325 307/130 |
| 2016/0351868 A1* | 12/2016 | Eom | H01M 50/581 |
| 2017/0001536 A1* | 1/2017 | Seo | H01M 10/48 |
| 2017/0310126 A1* | 10/2017 | Nguyen | H02J 7/0018 |
| 2018/0062150 A1 | 3/2018 | Kim | |
| 2018/0115178 A1 | 4/2018 | Moon et al. | |
| 2019/0052109 A1* | 2/2019 | Sturnfield | H02J 7/0032 |
| 2020/0161888 A1* | 5/2020 | Imanaka | H02H 7/18 |

FOREIGN PATENT DOCUMENTS

| | | | |
|---|---|---|---|
| KR | 10-2017-0052028 A | 5/2017 | |
| KR | 10-2018-0045954 A | 5/2018 | |

\* cited by examiner

BATTERY PACK AND TRANSPORTATION APPARATUS INCLUDING THE BATTERY PACK

CROSS-REFERENCE TO RELATED APPLICATION

This application claims priority to, and the benefit of, Korean Patent Application No. 10-2018-0112380, filed on Sep. 19, 2018, in the Korean Intellectual Property Office, the disclosure of which is incorporated herein in its entirety by reference.

BACKGROUND

1. Field

One or more embodiments relate to a battery pack, and to a transportation apparatus including the battery pack.

2. Description of Related Art

In general, secondary batteries are rechargeable, unlike primary batteries. Secondary batteries may be used as energy sources for mobile devices, electric vehicles, hybrid vehicles, electric bicycles, uninterruptible power supplies, or the like. Depending on the types of external devices to which they are applied, secondary batteries may be used in the form of a single battery, or in the form of a battery module in which a plurality of batteries are connected and combined into one unit.

A small mobile device, such as a mobile phone, may operate for a certain amount of time according to the output and capacity of a single battery. However, in the case of driving for an extended amount of time, or in the case of high-power driving, such as in the case of an electric vehicle or a hybrid vehicle with high power consumption, a battery module including a plurality of batteries may be preferred due to output and capacity issues, and the battery module may increase the output voltage or the output current according to the number of built-in batteries.

SUMMARY

One or more embodiments of an embodiment of the present disclosure include a battery pack and a transportation apparatus including the battery pack, which may start a suitable protection operation by waking up a battery management system for monitoring a state of the battery pack, and for controlling a charge/discharge operation thereof, by being able to detect an abnormal situation of a battery module even when the battery management system is in a sleep mode.

According to one or more embodiments, a battery pack includes a battery module, a battery management system configured to control charging and discharging operations of the battery module, a power supply terminal arranged to supply operation power, and a switch connected between the power supply terminal and the battery management system, and configured to be turned on in response to an abnormal situation of the battery module.

The power supply terminal may be connected to a constant-voltage power supply that is configured to supply a voltage that is lower than an output voltage of the battery module.

The battery management system may be configured to be woken up according to a start of power being supplied thereto by being connected to the power supply terminal when the switch is turned on.

The battery management system may include a controller for controlling an overall operation of the battery management system, and a power converter configured to provide driving power of the controller by receiving power from the power supply terminal.

The switch may be connected between the power supply terminal and the power converter, wherein the power converter is configured to output driving power of the controller by receiving the power from the power supply terminal according to the switch being turned on.

The switch may include a mechanical switch including a frame, and also including a fixed contact member and a movable contact member respectively fixed to different sides of the frame, the movable contact member being exposed to an accommodation space in which the battery module is accommodated.

The fixed contact member may be fixed to the frame by a fixing pin fastened to the frame through a central position of the fixed contact member.

The movable contact member may include a fixed end portion fixed to the frame, a free end portion facing at least a portion of the fixed contact member to contact the fixed contact member when the free end portion is physically modified by a high temperature that is above a reference temperature, or by a high pressure that is above a reference pressure, and a hinge portion that is thinner than the free end portion or the fixed end portion, and that is configured to allow modification of the free end portion while connecting the fixed end portion and the free end portion to each other.

The fixed contact member and the movable contact member may be exposed to an accommodation space in which the battery module is accommodated.

The switch may be arranged between the battery module and the battery management system.

The switch may be arranged on an outer surface of the battery module facing the battery management system.

The switch may be arranged on an outer surface of the battery management system facing the battery module.

The battery pack may further include a pack case accommodating the battery module, the battery management system, and the switch, wherein the switch is arranged on an inner surface of the pack case facing the battery module.

The switch may include an electronic switch, wherein the battery pack further includes a sensor connected to the electronic switch to detect an abnormal situation of the battery module to turn on the electronic switch.

The sensor may include a temperature sensor arranged to sense a temperature of the battery module, or a pressure sensor arranged to sense a pressure of the battery module.

According to one or more embodiments, a transportation apparatus includes a battery module, a battery management system configured to control charging and discharging operations of the battery module, a power supply configured to supply operation power, a switch connected between the power supply and the battery management system, and configured to be turned on by detecting an abnormal situation of the battery module, a motor arranged to receive driving power from the battery module, and an electronic controller (ECU) configured to control overall driving of the motor.

The switch may be connected between the power supply and a first node, wherein the battery management system and the ECU are connected to the first node.

The battery management system and the ECU may be configured to be woken up according to a start of power supply thereto by being substantially simultaneously connected to the power supply through the first node when the switch is turned on.

The switch may include an electronic switch, wherein the transportation apparatus further includes a sensor connected to the electronic switch and configured to detect an abnormal situation of the battery module and to turn on the electronic switch.

The sensor may include a temperature sensor arranged to sense a temperature of the battery module, or a pressure sensor arranged to sense a pressure of the battery module.

DETAILED DESCRIPTION

Figure 1:
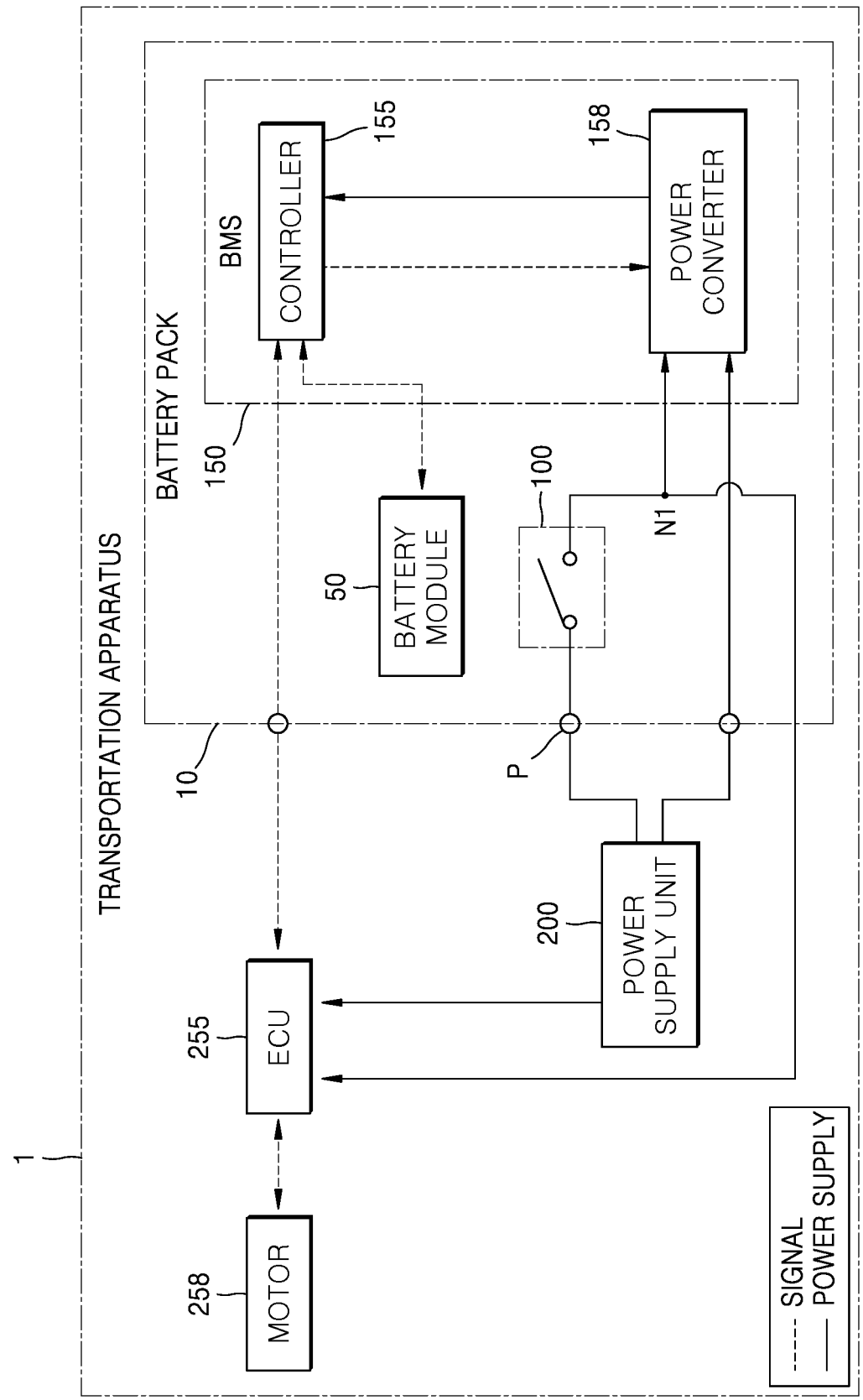
FIG. 1 is a diagram illustrating a schematic configuration of a battery pack of an embodiment of the present disclosure and a transportation apparatus including the battery pack.

Features of the inventive concept and methods of accomplishing the same may be understood more readily by reference to the detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects of the present inventive concept to those skilled in the art. Accordingly, processes, elements, and techniques that are not necessary to those having ordinary skill in the art for a complete understanding of the aspects of the present inventive concept may not be described.

Unless otherwise noted, like reference numerals denote like elements throughout the attached drawings and the written description, and thus, descriptions thereof will not be repeated. Further, parts not related to the description of the embodiments might not be shown to make the description clear. In the drawings, the relative sizes of elements, layers, and regions may be exaggerated for clarity.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of an embodiment of the present disclosure. Thus, embodiments disclosed herein should not be construed as limited to the particular illustrated shapes of regions, but are to include deviations in shapes that result from, for instance, manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of an embodiment of the present disclosure.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

For the purposes of this disclosure, expressions such as "at least one of," when preceding a list of elements, modify the entire list of elements and do not modify the individual elements of the list. For example, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

The terminology used herein is for the purpose of describing particular embodiments only and is not intended to be limiting of an embodiment of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of an embodiment of the present disclosure refers to "one or more embodiments of an embodiment of the present disclosure."

When a certain embodiment may be implemented differently, a specific process order may be performed differently from the described order. For example, two consecutively described processes may be performed substantially at the same time or performed in an order opposite to the described order.

The electronic or electric devices and/or any other relevant devices or components according to embodiments of an embodiment of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate.

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of an embodiment of the present disclosure.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Hereinafter, battery packs and transportation apparatuses including the battery packs according to example embodiments of an embodiment of the present disclosure will be described with reference to the accompanying drawings.

Figure 2:
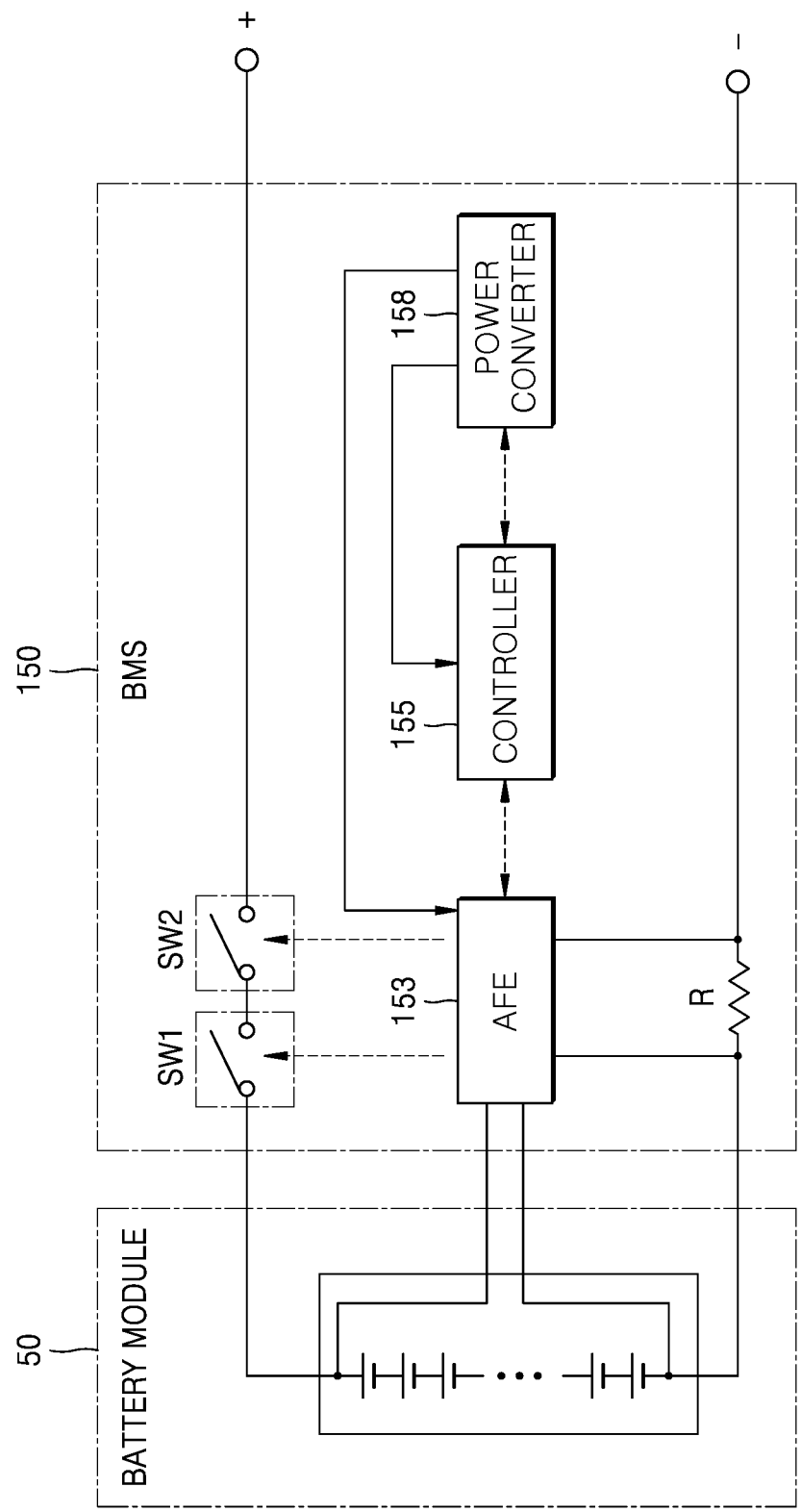
FIG. 2 is a diagram illustrating a more particular configuration of a battery management system illustrated in FIG. 1.

FIG. 1 is a diagram illustrating a schematic configuration of a battery pack of an embodiment of the present disclosure and a transportation apparatus including the battery pack. FIG. 2 is a diagram illustrating a more particular configuration of a battery management system illustrated in FIG. 1.

A transportation apparatus 1 of an embodiment of the present disclosure may include any transportation apparatus for mounting a battery pack 10 and using the battery pack 10 as an energy source, and may generally include any type of transportation apparatus, such as an electric bike or electric vehicle. As described below, the transportation apparatus 1 of an embodiment of the present disclosure may include a battery pack 10 as an energy source, a motor 258 for receiving the driving power from the battery pack 10, and an electronic controller/electronic control unit (ECU) 255 for controlling the overall driving of the motor 258.

The battery pack 10 of an embodiment of the present disclosure may be mounted in the transportation apparatus 1 to provide the driving power, and, for example, may include a battery module 50 including a plurality of battery cells, and a battery management system (BMS) 150 for controlling the charge/discharge operation of the battery module 50.

The battery module 50 may be provided in a modular form in which a plurality of battery cells are electrically connected to provide high capacity and high power. The output power of the battery module 50 may be supplied to the motor 258 of the transportation apparatus 1. The ECU 255 may be mounted in the transportation apparatus 1 to control the overall driving of the motor 258. A controlled driving current may be supplied to the motor 258 according to a motor driving signal output from the ECU 255.

Referring to FIG. 2, the BMS 150 may include a controller 155 for controlling an overall operation of the BMS 150. The BMS 150 may include an analog front end (AFE) 153 for converting a measurement value about state information, such as temperature or voltage transmitted from the battery module 50, into a quantized digital value, and for transmitting the same to the controller 155, and for outputting an on/off control signal for a charge switch SW2 and a discharge switch SW1 according to a control signal of the controller 155.

For example, an operation of the BMS may be as follows. That is, the BMS 150 may monitor the state of the battery module 50, and may control the charge/discharge operation of the battery module 50. For example, the BMS 150 may control the charge/discharge operation of the battery pack 10 by controlling the on/off operations of the charge switch SW2 and the discharge switch SW1 connected on the charge/discharge path of the battery module 50.

For example, the BMS 150 may obtain information about voltage and temperature through a voltage measurement terminal and through a thermistor mounted on the battery module 50. The BMS 150 may measure a charge/discharge current amount by using a current sensor R arranged on the charge/discharge path. Based on the state information of the battery module 50, such as voltage, current, and temperature, the BMS 150 may detect an abnormal situation, such as overcharge, overdischarge, or overcurrent, and may perform a protection operation of the battery module 50. Also, the BMS 150 may perform a cell-balancing operation for balancing a charge state between the respective battery cells of the battery module 50, and for example, the BMS 150 may perform a cell-balancing operation of discharging the battery cell having a relatively high charge state and/or charging the battery cell having a relatively low charge state.

The BMS 150 may include a controller 155 for controlling an overall operation of the BMS 150, and may include a power converter 158 for supplying power to each point of the BMS 150 including the controller 155. The controller 155 may output an on/off control signal(s) for the charge switch SW2 and the discharge switch SW1 connected on the charge/discharge path of the battery module 50 through the AFE 153, may determine the start time of a cell-balancing operation, may control the cell-balancing operation, and may generate information about a state of charging (SOC), a state of health (SOH), or the like of the battery module 50.

Referring to FIG. 1, the power converter 158 may receive power supplied from a power supply 200. The power converter 158 may convert the power of the power supply 200 into power receivable at each point of the BMS 150, may supply the same as the operation power of the BMS 150, and may supply the operation power for each circuit of the BMS 150 including the controller 155.

The power supply 200 may be a constant-voltage power supply, and may supply a constant-voltage power of 12 V, and may supply the operation power for the BMS 150 of the battery pack 10 and for the ECU 255 of the transportation apparatus 1. Various electric loads corresponding to elements mounted in the transportation apparatus 1 and connected to the power supply 200. The various electric loads may receive the operation power supplied from the power supply 200.

The power supply 200 may be provided in the transportation apparatus 1 as a separate component from the battery pack 10, and may be connected to the battery pack 10 through a power supply terminal P of the battery pack 10. For example, and according to an embodiment of the present disclosure, the fact that the BMS 150 receives the power supply from the power supply 200 of the transportation apparatus 1 may mean that the BMS 150 receives the power supply from the power supply terminal P connected to the power supply 200. As described herein, the power supply 200 of the transportation apparatus 1 and the power supply terminal P of the battery pack 10 may be replaced with each other.

The power supply 200 may be provided as an auxiliary battery that is other than the battery pack 10 as a main power source of the transportation apparatus 1. The high-voltage power supplied from the battery pack 10 may be converted into a low voltage (e.g., of about 12 V) through a DC-DC converter, and then may be charged into the power supply 200.

In an ignition (IG) state where a start switch (start key) of the transportation apparatus 1 is turned on, the power converter 158 may supply the operation power of the BMS 150. That is, the power converter 158 may convert the power of the power supply 200 into power that is suitable for driving the controller 155, and may supply the converted power as the driving power of the controller 155. The power converter 158 may supply driving power suitable for each circuit of the BMS 150 including the controller 155.

For example, in the IG state where the start switch (start key) is turned on, driving power may be supplied to the controller 155 to operate the controller 155 for a certain time, and the controller 155 may output a power supply signal to the power converter 158 to supply the operation power thereto. When receiving the power supply signal from the controller 155, the power converter 158 may convert the power of the power supply 200 into power suitable for driving the controller 155, and may supply the converted power as the driving power of the controller 155.

The power converter 158 may block the operation power of the BMS 150 in a state where the start switch (start key) of the transportation apparatus 1 is turned off, and the BMS 150 may be switched to a sleep mode in which the operation power is blocked.

For example, the controller 155 may output a power blocking signal to the power converter 158 to block the operation power of the BMS 150 in the state where the start switch (start key) is turned off, and accordingly, the BMS 150 may be switched to the sleep mode in which the operation power is blocked. The BMS 150 may wait in the sleep mode in a state where the ignition of the transportation apparatus 1 is turned off, and may start operation as the ignition power is supplied thereto when the ignition of the transportation apparatus 1 is turned on.

The BMS 150 may wait in the sleep mode in the state where the ignition of the transportation apparatus 1 is turned off, and may be switched from the sleep mode to a wake-up mode as the power supply to the BMS 150 is started according to the operation of a mechanical switch 100 that has detected an abnormal situation of the battery module 50, such as overheating or high pressure. Also, in response to an abnormal situation of the battery module 50, the BMS 150 may start a protection operation of the battery module 50, may output an alarm signal to the inside of the transportation apparatus 1 to induce evacuation of passengers, or may provide an alarm signal to a remote operator through a wireless communication network.

Even in the sleep mode where the operation power is blocked, the BMS 150 may prevent the occurrence of a safety accident, such as the explosion or ignition of the battery module 50, according to an operation of the mechanical switch 100 detecting an abnormal situation of the battery module 50, such as overheating and high pressure, to wake up the BMS 150.

The mechanical switch 100 may be turned on as a contact(s) thereof is connected under a high temperature that is above a sensitive temperature, or under a high pressure that is above a sensitive pressure. When turned on, the mechanical switch 100 may be connected between the power supply 200 (or the power supply terminal P) and the BMS 150 to thereby connect the power supply 200 (or the power supply terminal P) and the BMS 150 (for example, the power converter 158 of the BMS 150) to each other. The structure of the mechanical switch 100 will be described below in more detail.

An ECU 255 communicatively connected to the BMS 150 of the battery pack 10 may be mounted in the transportation apparatus 1. Based on information, such as the speed of the transportation apparatus 1 and the accelerator and brake of the transportation apparatus 1, the ECU 255 may output a motor driving signal and may control the rotation speed or torque of the motor 258. A controlled driving current may be applied to the motor 258 according to the motor driving signal output from the ECU 255.

The ECU 255 of the transportation apparatus 1 and the BMS 150 of the battery pack 10 may be communicatively connected to each other to exchange information through a communication line, such as a controller area network (CAN). For example, the BMS 150 may generate information about an SOC, an SOH, or the like, and may transmit the information to the ECU 255 of the transportation apparatus 1.

The mechanical switch 100 may be connected to both of the BMS 150 of the battery pack 10 and the ECU 255 of the transportation apparatus 1. The mechanical switch 100 may be turned on as the contact(s) thereof is connected under a high temperature that is above a sensitive temperature or under a high pressure that is above a sensitive pressure, and may wake up the BMS 150 as the power supply to the BMS 150 is started. When turned on, the mechanical switch 100 may substantially simultaneously wake up the BMS 150 of the battery pack 10 and the ECU 255 of the transportation apparatus 1. For example, the mechanical switch 100 may be connected between the power supply 200 and a first node N1. The BMS 150 of the battery pack 10 and the ECU 255 of the transportation apparatus 1 may be connected to the first node N1 and thus to the power supply 200. The BMS 150 of the battery pack 10 and the ECU 255 of the transportation apparatus 1 may be substantially simultaneously connected through the first node N1 when the mechanical switch 100 is turned on. The BMS 150 of the battery pack 10 and the ECU 255 of the transportation apparatus 1 may be substantially simultaneously woken up as the power supply to the BMS 150 of the battery pack 10 and to the ECU 255 of the transportation apparatus 1 is started.

As such, the mechanical switch 100 may be turned on under a high temperature that is above a sensitive temperature or under a high pressure that is above a sensitive pressure to substantially simultaneously wake up the BMS 150 of the battery pack 10 and the ECU 255 of the transportation apparatus 1. Thus, the BMS 150 of the battery pack 10 and the ECU 255 of the transportation apparatus 1, which have effectively sensed an abnormal situation of the battery module 50, may perform operations for prevention of a safety hazard, or of a potential accident such as the ignition or explosion of the battery module 50, and for evacuation of passengers together in cooperation with each other.

In an embodiment of the present disclosure, the BMS 150 of the battery pack 10 may be switched to the wake-up mode as the power supply is started immediately according to the turn-on of the mechanical switch 100. Contrastingly, in another embodiment of the present disclosure, the BMS 150 of the battery pack 10 may be switched from the sleep mode to the wake-up mode as the power supply to the BMS 150 of the battery pack 10 is started according to a start signal generated by turning on the mechanical switch 100.

Similarly, in an embodiment of the present disclosure, the ECU 255 of the transportation apparatus 1 may be switched to the wake-up mode as the power supply is started immediately according to the turn-on of the mechanical switch 100. Contrastingly, in another embodiment of the present disclosure, the ECU 255 of the transportation apparatus 1 may be switched from the sleep mode to the wake-up mode as the power supply to the ECU 255 of the transportation apparatus 1 is started according to a start signal generated by turning on the mechanical switch 100.

Figure 3:
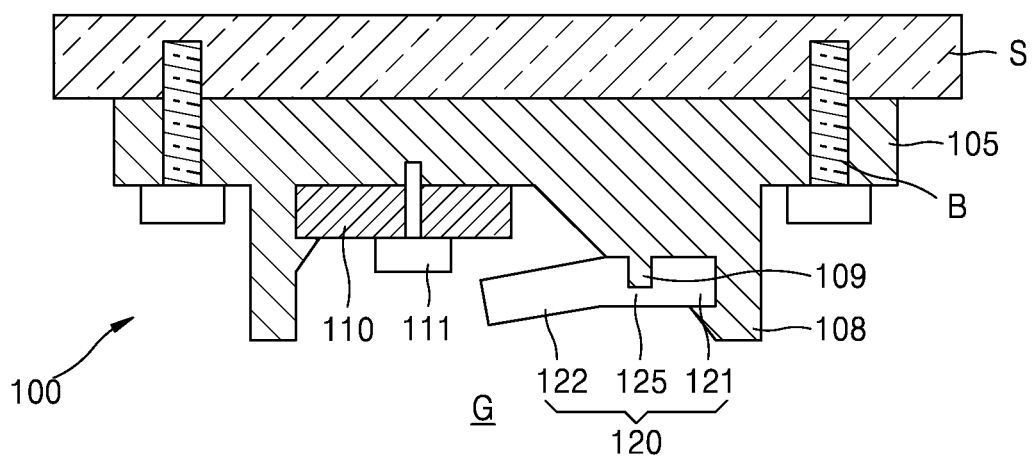
FIGS. 3 and 4 are diagrams illustrating a structure of a mechanical switch according to an embodiment of the present disclosure, which illustrate a turn-off state and a turn-on state respectively.
Figure 4:
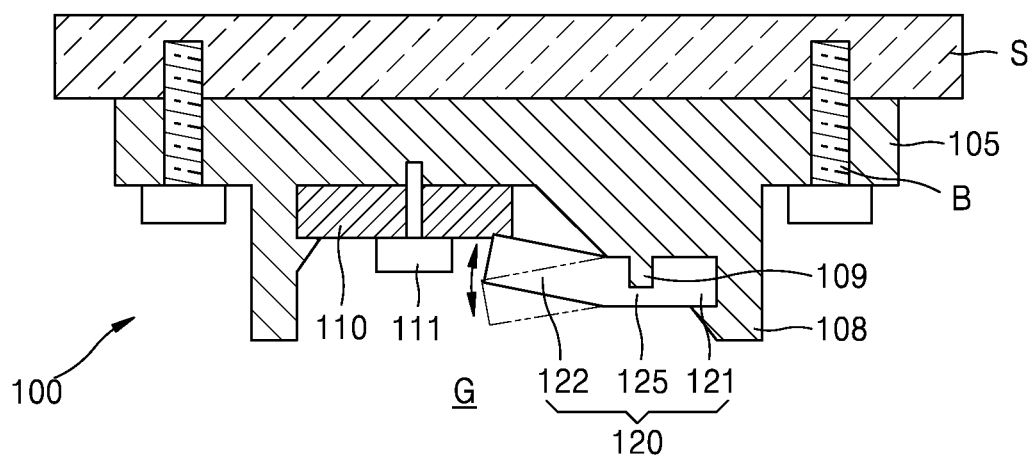
Figure 5:
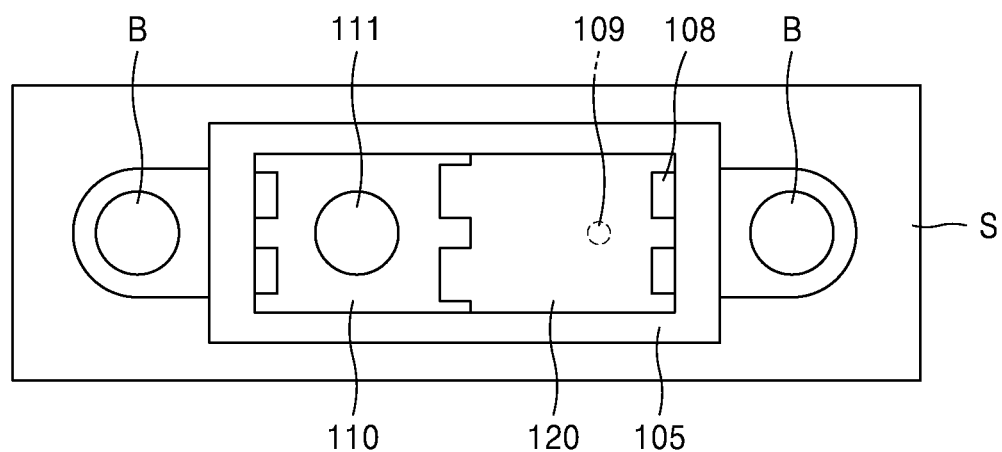
FIG. 5 is a diagram illustrating a planar structure of a mechanical switch.

FIGS. 3 and 4 are diagrams illustrating a structure of the mechanical switch 100 according to an embodiment of the present disclosure, and respectively illustrate a turn-off state and a turn-on state. FIG. 5 is a diagram illustrating a planar structure of the mechanical switch 100.

Referring to the drawings, the mechanical switch 100 may be triggered in response to the ambient temperature and/or pressure thereof (e.g., of the battery pack 10). The mechanical switch 100 may be switched to the turn-on state when some configuration of the mechanical switch 100 is physically modified under a high temperature that is above a sensitive temperature, or under a high pressure that is above a sensitive pressure. The mechanical switch 100 may not require a separate electrical power supply for the turn-on operation of the mechanical switch 100. The mechanical switch 100 might not be electrically driven, and may be turned on according to physical environment variables, such as ambient temperature and/or pressure.

For example, the mechanical switch 100 may include a frame 105, a fixed contact member 110 fixed to the frame 105, and a movable contact member 120 capable of being modified to thereby contact the fixed contact member 110 according to the ambient temperature/pressure thereof.

The frame 105 may be coupled onto a support structure S supporting the mechanical switch 100, and for example, the frame 105 may be coupled onto the support structure S through a fastening member such as a bolt B. As described below, the mechanical switch 100 may be accommodated in a pack case 15 (see FIG. 6) together with the battery module 50, and may be coupled to an inner surface of the pack case 15 (see FIG. 6) while facing the battery module 50. In this case, the support structure S may correspond to the pack case 15 (see FIG. 6). In another embodiment of the present disclosure, the mechanical switch 100 may be coupled to one of the outer surfaces of the battery module 50 and the BMS 150 facing each other, and in this case, the support structure S may correspond to the outer surface of the battery module 50 or to the outer surface of the BMS 150.

The movable contact member 120 may have a structure capable of being modified according to the ambient temperature and/or the pressure thereof, and may be connected to (e.g., electrically connected to) the fixed contact member 110 by contacting the fixed contact member 110 according to the physical modification thereof. For example, the movable contact member 120 may be spaced apart from the fixed contact member 110 to maintain the turn-off state in a normal state of the battery module 50, and the movable contact member 120 may be switched to the turn-on state by being modified to contact the fixed contact member 110 under a high temperature that is above a sensitive temperature (e.g., due to thermal expansion) or under a high pressure that is above a sensitive pressure.

The movable contact member 120 may be formed as various structures that may be connected to the fixed contact member 110 through shape modification in a state where an accommodation space G of the battery module 50 is overheated above a sensitive temperature, and for example, the movable contact member 120 may be formed of a bimetal or a shape memory alloy. The movable contact member 120 may include a fixed end portion 121 that is fixed to the frame 105, and a free end portion 122 that is arranged to face at least a portion of the fixed contact member 110 and that forms contact with the fixed contact member 110 according to physical modification thereof. A hinge portion 125 with a relatively small thickness may be formed between the fixed end portion 121 and the free end portion 122 to allow the modification of the free end portion 122, while still connecting the fixed end portion 121 and the free end portion 122 to each other. The fixed end portion 121 of the movable contact member 120 may be position-fixed to the frame 105 by a latch jaw 108 of the frame 105 and an assembly pin 109 inserted into the hinge portion 125.

The movable contact member 120 may be switched to the turn-on state by being modified to contact the fixed contact member 110 in conformance with the accumulated pressure achieving a high-pressure state, where the pressure is accumulated in the accommodation space G of the battery module 50. The movable contact member 120 may be turned on by contacting the fixed contact member 110 as the free end portion 122 is rotated, due to high pressure or high temperature, toward the fixed contact member 110 with respect to the hinge portion 125 between the fixed end portion 121 and the free end portion 122.

The fixed contact member 110 may also be modified according to the ambient temperature/pressure thereof. However, whether the connection between the fixed contact member 110 and the movable contact member 120 occurs may depend on the modification of the movable contact member 120, and accordingly, the turn-on condition of the mechanical switch 100 may be finely tuned according to the sensitive temperature or the sensitive pressure of the movable contact member 120. The fixed contact member 110 may be position-fixed to the frame 105 by a fixing pin 111, and the fixing pin 111 may be fastened to the frame 105 through the fixed contact member 110 at a central position of the fixed contact member 110 to prevent or reduce modification or movement of the fixed contact member 110.

The fixed contact member 110 and the movable contact member 120 may be position-fixed to different sides of the frame 105, respectively. The fixed contact member 110 and the movable contact member 120 may be arranged to be exposed from (e.g., below portions of) the frame 105. In an embodiment of the present disclosure, both the fixed contact member 110 and the movable contact member 120 may be exposed from the frame 105. Contrastingly, in another embodiment of the present disclosure, the fixed contact member 110 may not be exposed to the accommodation space G of the battery module 50 by being concealed by the frame 105, and the movable contact member 120 may be exposed to the accommodation space G of the battery module 50 by escaping from, or being exposed at a portion of, the frame 105.

For example, the frame 105 may not completely surround the fixed contact member 110 and the movable contact member 120, and a portion of the frame 105 may be opened. Thus, at least the movable contact member 120 may be exposed to the accommodation space G of the battery module 50, and accordingly, the movable contact member 120 may be exposed to the accommodation space G of the battery module 50 so as to be able to detect an abnormal situation of the battery module 50 with relatively high sensitivity. Further, the frame 105 may be formed in an open shape such that the battery module 50 and the movable contact member 120 are not isolated from each other by the frame 105. As described below, the mechanical switch 100 may be arranged in the pack case 15 (see FIG. 6) in which the battery module 50 is accommodated, and the mechanical switch 100 and the battery module 50 may be fluidly connected to each other through the inner space of the pack case 15 (e.g., the accommodation space G accommodating the battery module 50). Here, that the mechanical switch 100 and the battery module 50 are fluidly connected to each other may mean that there is no structure interposed between the mechanical switch 100 and the battery module 50 to isolate the mechanical switch 100 and the battery module 50 from each other, or to separate the mechanical switch 100 and the batter module 50 into different spaces, such that the temperature and pressure of the battery module 50 may be intactly transmitted to the mechanical switch 100 (for example, the movable contact member 120 of the mechanical switch 100).

Figure 6:
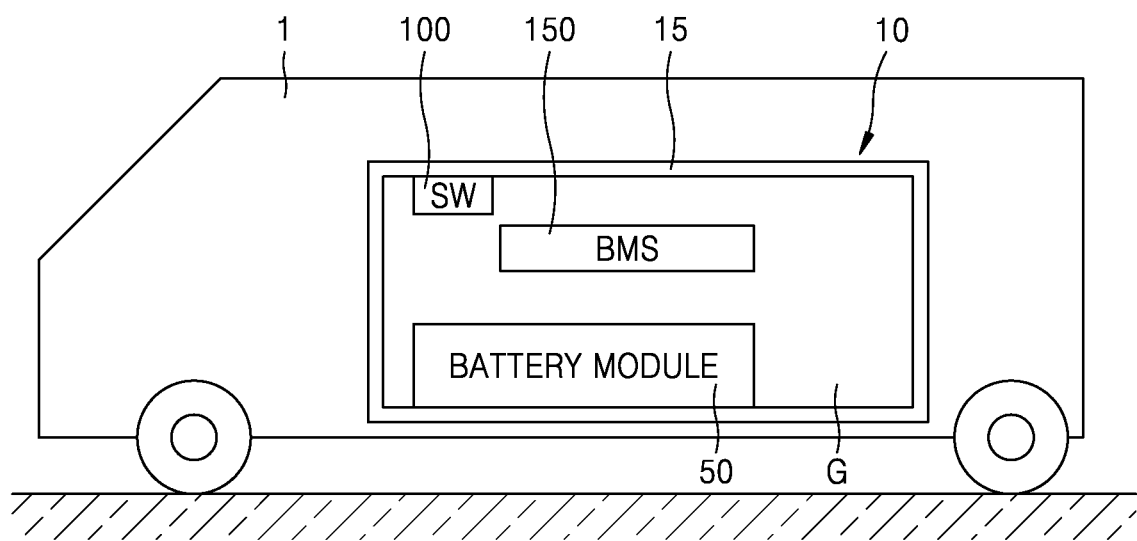
FIGS. 6 to 8 illustrate different arrangement structures of the mechanical switch illustrated in FIG. 3.
Figure 7:
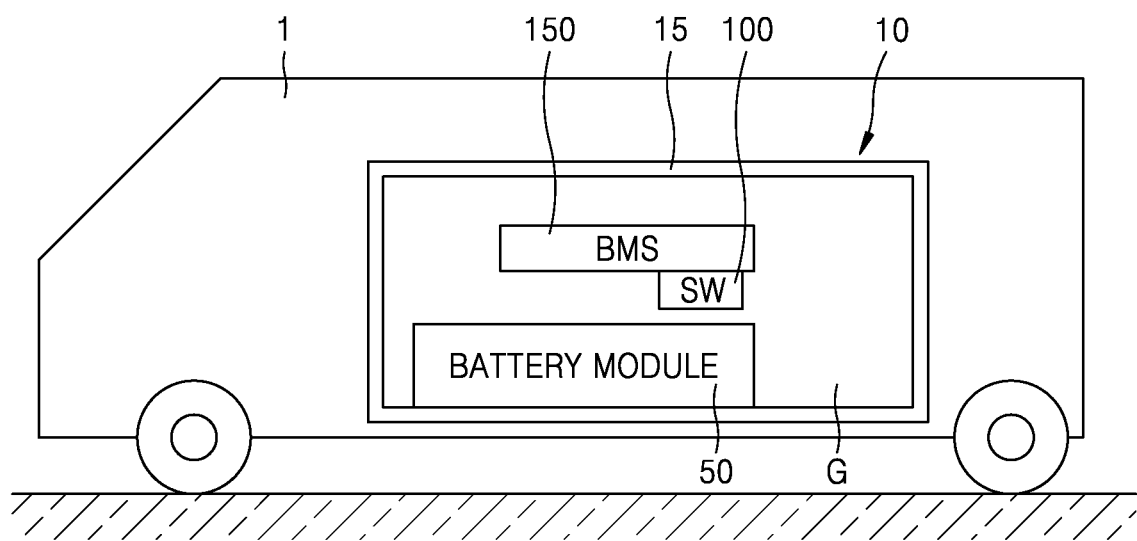
Figure 8:
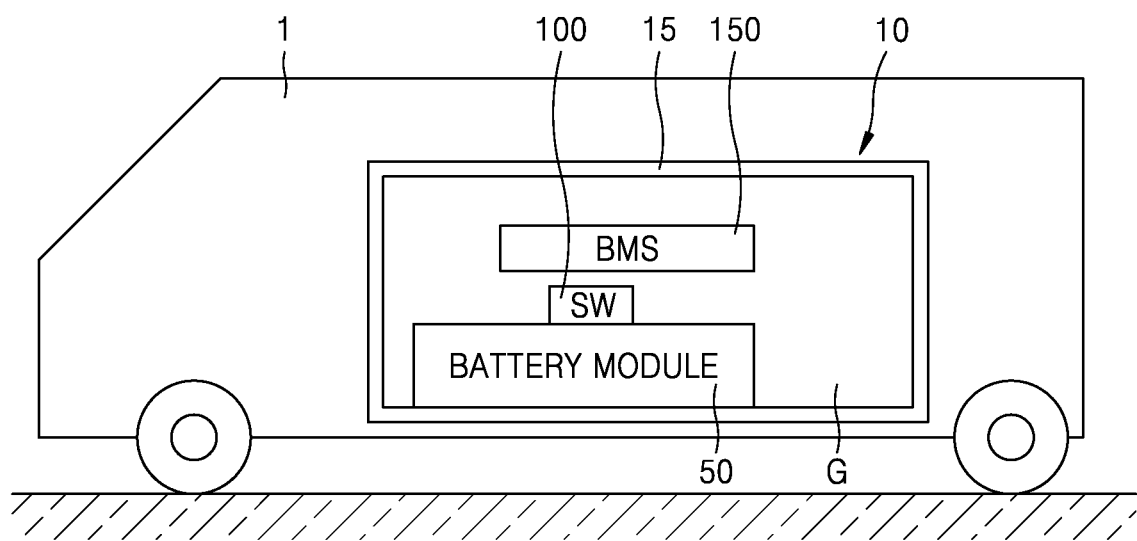

FIGS. 6 to 8 illustrate different arrangement structures of the mechanical switch 100 illustrated in FIG. 3.

Referring to the drawings, the mechanical switch 100 may be arranged in the pack case 15 together with the battery module 50. The pack case 15 may form the external shape of the battery pack 10, and may function to protect the internal configuration of the battery pack 10 from the external environment thereof. The pack case 15 may provide the accommodation space G in which the battery module 50 is accommodated, and the internal space of the pack case 15 may refer to the accommodation space G of the battery module 50.

The battery module 50 and the BMS 150 may be accommodated in the pack case 15, and the mechanical switch 100 may be arranged at any position in the pack case 15 as long as the mechanical switch 100 is arranged in the internal space of the pack case 15 (the accommodation space G accommodating the battery module 50). For example, the mechanical switch 100 may be arranged on an inner surface of the pack case 15 facing the battery module 50, and, for example, may be arranged on an upper inner surface of the pack case 15. Because the mechanical switch 100 is formed at a position facing the battery module 50, the temperature/pressure or the like of the battery module 50 may be effectively transmitted to the mechanical switch 100. That is, hot air heated by the battery module 50 may move above the battery module 50 by buoyancy or convection, and may be sensed by the mechanical switch 100. Also, the high-pressure gas caused by the explosion or the like of the battery module 50 may move above the battery module 50, and may be sensed by the mechanical switch 100.

In the embodiment illustrated in FIGS. 7 and 8, the mechanical switch 100 may be arranged between the battery module 50 and the BMS 150. The mechanical switch 100 may be arranged at a position adjacent to the battery module 50 so as to react sensitively to the temperature/pressure of the battery module 50, and may be located at a position close to both the battery module 50 and the BMS 150. That is, the mechanical switch 100 may be between the battery module 50 and the BMS 150, so as to shorten the length of a line connected to the BMS 150. That the mechanical switch 100 is arranged between the battery module 50 and the BMS 150 may include that the mechanical switch 100 is arranged on any one of an outer surface of the battery module 50 or an outer surface of the BMS 150, the respective outer surfaces facing each other.

In the embodiment illustrated in FIG. 7, the mechanical switch 100 may be arranged on an outer surface of the BMS 150 facing the battery module 50. For example, the mechanical switch 100 may be mounted on a circuit board forming the BMS 150, and may be arranged on a lower surface of the circuit board facing the battery module 50. In this case, because the mechanical switch 100 is mounted on the BMS 150, the length of a line between the mechanical switch 100 and the BMS 150 may be shortened.

In the embodiment illustrated in FIG. 8, the mechanical switch 100 may be arranged on an outer surface of the battery module 50 facing the BMS 150. For example, the mechanical switch 100 may be arranged on an upper surface of the battery module 50 facing the BMS 150. In this case, because the mechanical switch 100 is arranged on the battery module 50, the temperature and pressure of the battery module 50 may be sensed with high sensitivity, and an abnormal situation, such as overheating or explosion of the battery module 50, may be detected without error.

Figure 9:
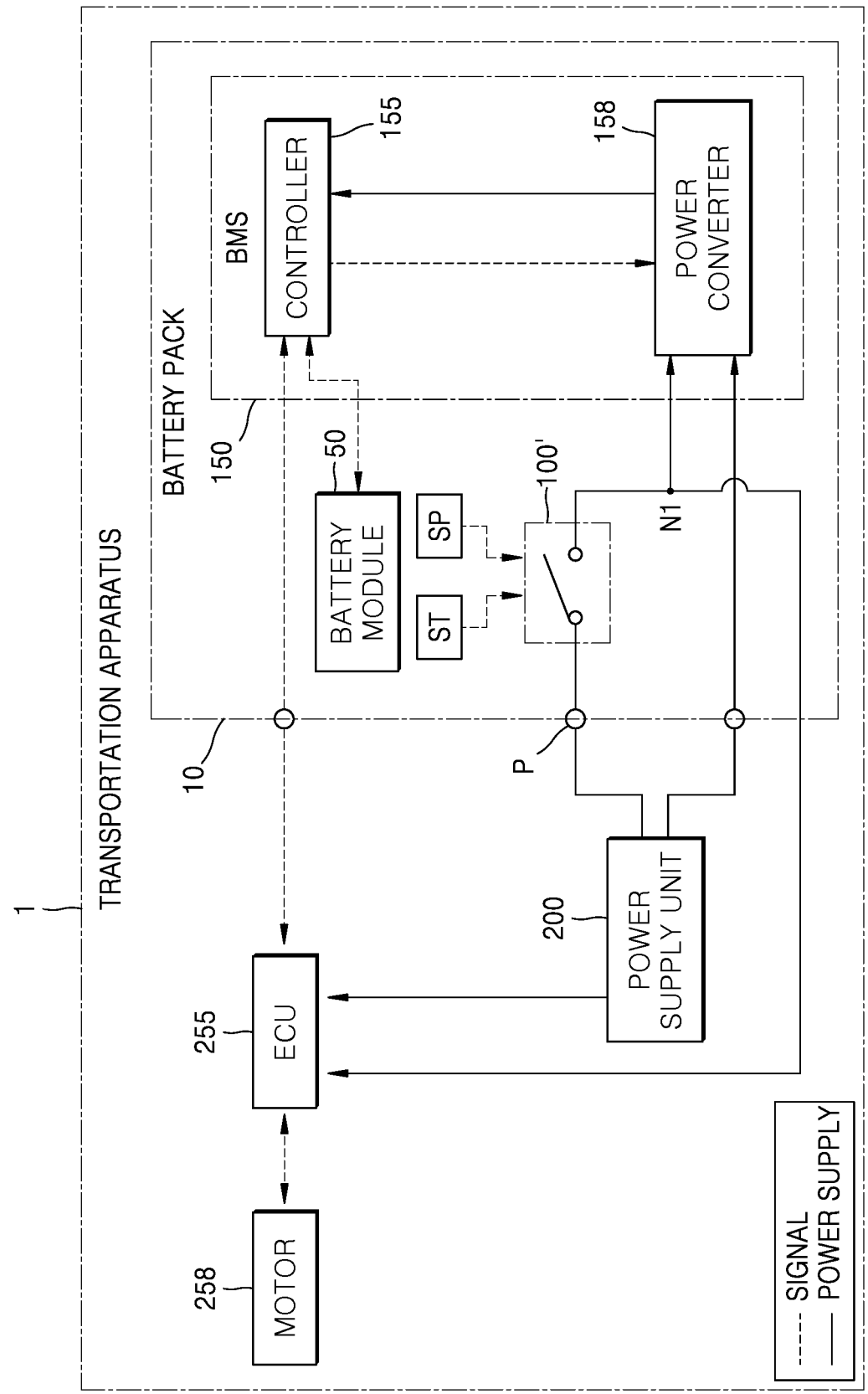
FIG. 9 is a diagram illustrating a schematic configuration of a battery pack, according to another embodiment of the present disclosure, and a transportation apparatus including the battery pack.

FIG. 9 is a diagram illustrating a schematic configuration of a battery pack, according to another embodiment of the present disclosure, and a transportation apparatus including the battery pack.

A transportation apparatus 1 illustrated in FIG. 9 may include a battery pack 10, a motor 258 for receiving the driving power from the battery pack 10, and an ECU 255 for controlling the overall driving of the motor 258.

The battery pack 10 may be mounted in the transportation apparatus 1 to provide driving power. For example, the battery pack 10 may include a battery module 50 including a plurality of battery cells, and a BMS 150 for controlling the charge and discharge operations of the battery module 50. The BMS 150 may include a controller 155 for controlling an overall operation of the BMS 150, and a power converter 158 for supplying power to each point of the BMS 150 including the controller 155.

The power converter 158 may receive power supplied from a power supply 200. The power supply 200 may be provided in the transportation apparatus 1 as a separate component from the battery pack 10, and may be connected to the battery pack 10 through a power supply terminal P of the battery pack 10.

The BMS 150 may wait in the sleep mode (e.g., in the state where the ignition of the transportation apparatus 1 is turned off), and may be switched from the sleep mode to the wake-up mode as the power supply to the BMS 150 starts according to the operation of a mechanical switch 100' that has detected an abnormal situation of the battery module 50, such as overheating or high pressure.

The electronic switch 100' may be connected to a temperature sensor ST for sensing the temperature of the battery module 50, and may be connected to a pressure sensor SP for sensing the pressure of the battery module 50. For example, the temperature sensor ST and the pressure sensor SP may be connected to a control electrode(s) of the electronic switch 100', and thus the electronic switch 100' may be turned on according to an output signal of the temperature sensor ST that senses a high temperature that is above a sensitive temperature/reference temperature, and/or the pressure sensor SP that senses a high pressure that is above a sensitive pressure/reference pressure. The electronic switch 100' may be connected between the power supply 200 (or the power supply terminal P) and the BMS 150 to thereby connect the power supply 200 (or the power supply terminal P) and the BMS 150 (for example, the power converter 158 of the BMS 150) to each other when the electronic switch 100' is turned on.

In an embodiment of the present disclosure, the electronic switch 100' may be provided as a semiconductor device for performing a switching function. For example, the electronic switch 100' may be provided as a field effect transistor (FET), a bipolar junction transistor (BJT), or the like. For example, the temperature sensor ST and the pressure sensor SP may be connected to a control electrode(s) (a gate or a base) of the electronic switch 100', and first and second electrodes of the electronic switch 100' may be connected to the power supply 200 (or the power supply terminal P) and the power converter 158, respectively.

Unlike the embodiment of FIG. 1, the embodiment of FIG. 9 may include an electronic switch 100' instead of the mechanical switch 100, and may include sensors ST and SP connected to the electronic switch 100' to detect an abnormal situation of the battery module 50 and to then turn on the electronic switch 100'. For example, a temperature sensor ST for sensing the temperature of the battery module 50, and a pressure sensor SP for sensing the pressure of the battery module 50, may be arranged at a position adjacent to the battery module 50.

For example, as in the description of the arrangement structure of the mechanical switch 100 with reference to FIGS. 6 to 8, the temperature sensor ST and the pressure sensor SP may be arranged at a position facing the battery module 50 to sensitively detect the temperature and pressure, or the like, of the battery module 50. For example, in a pack case 15 where the battery module 50 and the BMS 150 are accommodated, it may be arranged on an inner surface of the pack case 15 facing the battery module 50, or may be arranged between the battery module 50 and the BMS 150.

Meanwhile, as described with reference to FIG. 1, the electronic switch 100' may be connected to both of the BMS 150 of the battery pack 10 and the ECU 255 of the transportation apparatus 1. For example, when turned on, the electronic switch 100' may substantially simultaneously wake up both of the BMS 150 of the battery pack 10 and the ECU 255 of the transportation apparatus 1.

In the present disclosure, the switch 100 or 100', which may be turned on in response to an abnormal situation of the battery module, may be provided as the mechanical switch 100 as illustrated in FIG. 1, or may be provided as the electronic switch 100' as illustrated in FIG. 9. In this sense, the switch 100 or 100' in the present disclosure may include both the mechanical switch 100 and the electronic switch 100'.

According to the present disclosure, in a state where the start key of the transportation apparatus is turned off, that is, even while the battery management system for monitoring the state of the battery pack and controlling the charge/discharge operation thereof is in the sleep mode, an abnormal situation such as overheating or high pressure of the battery module may be detected to thereby wake up the battery management system and to start a suitable protection operation in response to the abnormal situation such, thereby preventing the occurrence of an accident, such as the ignition or explosion of the battery module, and thereby performing a suitable warning operation to induce the evacuation of passengers.

In an embodiment of the present disclosure, because an abnormal situation, such as overheating or high pressure of the battery module, may be detected to substantially simultaneously wake up the battery management system of the battery pack and the ECU of the transportation apparatus, the battery management system of the battery pack and the ECU of the transportation apparatus, which have sensed the abnormal situation of the battery module, may perform operations for prevention of a potential accident, such as the ignition or explosion of the battery module, and for evacuation of a passenger(s) together in cooperation with each other.

It should be understood that embodiments described herein should be considered in a descriptive sense only, and not for purposes of limitation. Descriptions of aspects within each embodiment should typically be considered as available for other similar aspects in other embodiments. While one or more embodiments have been described with reference to the figures, it will be understood by those of ordinary skill in the art that various changes in form and details may be made therein without departing from the spirit and scope as defined by the following claims, with functional equivalents thereof to be included therein.

What is claimed is:

1. A battery pack comprising:
   a battery module;
   a battery management system configured to control charging and discharging operations of the battery module;
   a power supply terminal arranged to supply operation power to the battery management system; and
   a switch connected between the power supply terminal and the battery management system, and configured to be turned on in response to an abnormal situation of the battery module to supply the operation power from the power supply terminal to the battery management system via the switch.

2. The battery pack of claim 1, wherein the power supply terminal is connected to a constant-voltage power supply that is configured to supply a voltage that is lower than an output voltage of the battery module.

3. The battery pack of claim 1, wherein the battery management system is configured to be woken up according to a start of power being supplied thereto by being connected to the power supply terminal when the switch is turned on.

4. The battery pack of claim 1, wherein the battery management system comprises:
   a controller for controlling an overall operation of the battery management system; and
   a power converter configured to provide driving power of the controller by receiving power from the power supply terminal.

5. The battery pack of claim 4, wherein the switch is connected between the power supply terminal and the power converter, and
   wherein the power converter is configured to output driving power of the controller by receiving the power from the power supply terminal according to the switch being turned on.

6. The battery pack of claim 1, wherein the switch comprises a mechanical switch comprising a frame, and also comprising a fixed contact member and a movable contact member respectively fixed to different sides of the frame, the movable contact member being exposed to an accommodation space in which the battery module is accommodated.

7. The battery pack of claim 6, wherein the fixed contact member is fixed to the frame by a fixing pin fastened to the frame through a central position of the fixed contact member.

8. A battery pack comprising:
   a battery module;
   a battery management system configured to control charging and discharging operations of the battery module;
   a power supply terminal arranged to supply operation power; and
   a switch connected between the power supply terminal and the battery management system, and configured to be turned on in response to an abnormal situation of the battery module,
   wherein the switch comprises a mechanical switch comprising a frame, and also comprising a fixed contact member and a movable contact member respectively fixed to different sides of the frame, the movable contact member being exposed to an accommodation space in which the battery module is accommodated, and
   wherein the movable contact member comprises:
      a fixed end portion fixed to the frame;
      a free end portion facing at least a portion of the fixed contact member to contact the fixed contact member when the free end portion is physically modified by a high temperature that is above a reference temperature, or by a high pressure that is above a reference pressure; and
      a hinge portion that is thinner than the free end portion or the fixed end portion, and that is configured to allow modification of the free end portion while connecting the fixed end portion and the free end portion to each other.

9. The battery pack of claim 6, wherein the fixed contact member and the movable contact member are exposed to an accommodation space in which the battery module is accommodated.

10. The battery pack of claim 1, wherein the switch is arranged between the battery module and the battery management system.

11. The battery pack of claim 10, wherein the switch is arranged on an outer surface of the battery module facing the battery management system.

12. The battery pack of claim 10, wherein the switch is arranged on an outer surface of the battery management system facing the battery module.

13. The battery pack of claim 1, further comprising a pack case accommodating the battery module, the battery management system, and the switch,
   wherein the switch is arranged on an inner surface of the pack case facing the battery module.

14. The battery pack of claim 1, wherein the switch comprises an electronic switch, and
   wherein the battery pack further comprises a sensor connected to the electronic switch to detect an abnormal situation of the battery module to turn on the electronic switch.

15. The battery pack of claim 14, wherein the sensor comprises a temperature sensor arranged to sense a temperature of the battery module, or a pressure sensor arranged to sense a pressure of the battery module.

* * * * *